US006394714B2

(12) United States Patent
Eberhard

(10) Patent No.: US 6,394,714 B2
(45) Date of Patent: May 28, 2002

(54) DRILL BIT

(75) Inventor: Helmut Eberhard, St. Josef (AT)

(73) Assignee: Johann Eberhard Gesellschaft m.b.H., St. Josef (AT)

( * ) Notice: Subject to any disclaimer, the term of this patent is extended or adjusted under 35 U.S.C. 154(b) by 0 days.

(21) Appl. No.: 09/798,702

(22) Filed: Mar. 2, 2001

(30) Foreign Application Priority Data

Mar. 3, 2000 (AT) ........................................ 146/2000 U

(51) Int. Cl.[7] ................................................ B23B 51/02

(52) U.S. Cl. ........................ 408/211; 408/213; 408/224; 408/225; 408/227

(58) Field of Search ................................. 408/211, 213, 408/214, 223, 224, 225, 227; 76/108.6

(56) References Cited

U.S. PATENT DOCUMENTS

| | | | | | |
|---|---|---|---|---|---|
| 1,185,380 | A | * | 5/1916 | Davis | 408/205 |
| 1,444,626 | A | * | 2/1923 | Maxim | 408/229 |
| 1,499,584 | A | * | 7/1924 | Litchfield | 408/224 |
| 1,655,836 | A | * | 1/1928 | Hawkinson | 408/199 |
| 2,883,888 | A | * | 4/1959 | Stewart | 408/214 |
| 3,945,753 | A | * | 3/1976 | Byers et al. | 408/214 |
| 4,090,807 | A | * | 5/1978 | Stewart | 408/214 |
| 4,248,555 | A | * | 2/1981 | Satou | 408/225 |
| 5,160,232 | A | * | 11/1992 | Maier | 408/223 |
| 5,312,207 | A | * | 5/1994 | Pomp | 408/213 |
| 5,695,304 | A | * | 12/1997 | Ebert | 408/223 |
| 5,975,814 | A | * | 11/1999 | Pomp | 408/225 |
| 6,213,692 | B1 | * | 4/2001 | Guehring et al. | 408/223 |
| 2001/0031178 | A1 | * | 10/2001 | Remke et al. | 408/225 |

FOREIGN PATENT DOCUMENTS

| | | | | | |
|---|---|---|---|---|---|
| DE | 2733301 | A1 | * | 2/1979 | 408/225 |
| DE | 3307727 | A1 | * | 10/1983 | 408/225 |

* cited by examiner

*Primary Examiner*—Daniel W. Howell
(74) *Attorney, Agent, or Firm*—Henry M. Feiereisen

(57) ABSTRACT

A drill bit, includes a shank and a cutter head connected to the shank. The cutter head has a center point, and first and second cutting edges extending radially outwards from opposite sides of the center point, wherein the first and second cutting edges are formed along their radial extension with valleys and peaks in alternating disposition such that in relation to the center point, as viewed in radial direction, the valleys of the first cutting edge are arranged at locations where the peaks of the second cutting edge are disposed, and the peaks of the first cutting edge are arranged at locations where valleys of the second cutting edge are disposed.

16 Claims, 6 Drawing Sheets

DRILL BIT

CROSS-REFERENCES TO RELATED APPLICATIONS

This application claims the priority of Austrian Patent Application Serial No. GM 146/2000, filed Mar. 3, 2000, the subject matter of which is incorporated herein by reference.

BACKGROUND OF THE INVENTION

The present invention relates, in general, to a drill bit, such as a Forstner bit or machine bit, and more particularly to a drill bit of a type having a shank and a cutting head which has a central center point and first and second cutting edges extending radially outwards from opposite sides of the center point.

Drill bits of this type are mass products for use in hand drills, drill presses, tap borers, or gang drilling machines, and produced in great numbers for commercial purposes. Holes of relatively great diameter can be drilled in a wide variety of materials such as plastic-coated chipboards, bonded wood panels, acrylic glass plates and other base materials. Conventional drill bits suffer, however, shortcomings because drilling machines are required to apply relatively high drilling forces and torques as the cutting edges must overcome with their straight edges high material resistance.

It would therefore be desirable and advantageous to provide an improved drill bit to obviate prior art shortcomings and to increase the efficiency of the drilling process by reducing drilling forces to be applied.

SUMMARY OF THE INVENTION

The present invention provides for a drill bit which includes a shank, and a cutter head connected to the shank and having a central center point and first and second cutting edges extending radially outwards from opposite sides of the center point, with the first and second cutting edges so formed along their radial extension with valleys and peaks in alternating disposition that in relation to the center point, as viewed in radial direction, the valleys of the first cutting edge are arranged at locations where the peaks of the second cutting edge are disposed, and the peaks of the first cutting edge are arranged at locations where valleys of the second cutting edge are disposed.

Through the provision of a repeating patterns of peaks and valleys in staggered relationship on the opposite cutting edges, the cutting force to be applied is divided, whereby the peaks of each cutting edge effect concentric, circular cutting tracks around the center point, while the offset disposition of the of peaks and valleys on the other cutting edge produces exactly the cutting tracks in-between. As a result, an overall even borehole is realized, while each cutting edge provides only half of the entire cutting energy. In this manner, the drilling procedure can be implemented at smaller drilling force and smaller torque.

According to another feature of the present invention, the peaks and valleys are formed by chip breaker profile, wave-shaped profile, knurled profile or similar teeth formation. The offset disposition of the peaks and valleys on both cutting edges leads in the wave-shaped profile, chip breaker profile, or knurled profile to the desired effect of reducing the drilling force. Depending on the material, a modification of the arrangement of the peaks and valleys provides an optimum cutting performance.

According to another aspect of the present invention, two bar-shaped cutting edges are arranged in 90° offset disposition to the first and second cutting edges on the circumference of the center point, thereby facilitating a centering of the drill bit during the drilling procedure and ensuring a precise drilling action.

According to another feature of the present invention, at least one of the peaks may have a tapered cross section in radial extension, as viewed in opposition to a rotation direction of the drill bit, and at least one of the valleys may have a widening cross section in radial extension, as viewed in opposition to a rotation direction of the drill bit. As a consequence of this configuration, the flanks of the peaks are prevented from touching the workpiece, thereby reducing friction and accompanying heat generation during the drilling procedure. In addition, this configuration permits a higher rotation speed and/or feed rate during the drilling procedure as the drill bit encounters less resistance from the material.

According to another aspect of the present invention, the at least one of the peaks may be configured in symmetry to its center line. The center line extends substantially in circumferential direction. The symmetric configuration of the peak likewise reduces the friction on the flanks on both sides of the peak. Suitably, the at least one peak evenly tapers in opposition to a rotation direction of the drill bit and defines flanks, with each of the flanks extending at a constant angle with respect to a normal to the cutting edges, whereby the valleys are configured as a part of a hollow cylinder or hollow truncated cone. As a consequence of the constant angle, the valley may be realized through milling with slanted milling axis, thereby keeping production costs to a minimum. It is further contemplated that the constant angle may range from 3° to 7°, preferably from 4° to 6°. This selection ensures that the friction of the flank of the peak is reduced and an excessive weakening of the peak is avoided.

BRIEF DESCRIPTION OF THE DRAWING

Other features and advantages of the present invention will be more readily apparent upon reading the following description of preferred exemplified embodiments of the invention with reference to the accompanying drawing, in which.

DETAILED DESCRIPTION OF PREFERRED EMBODIMENTS

Figure 1:
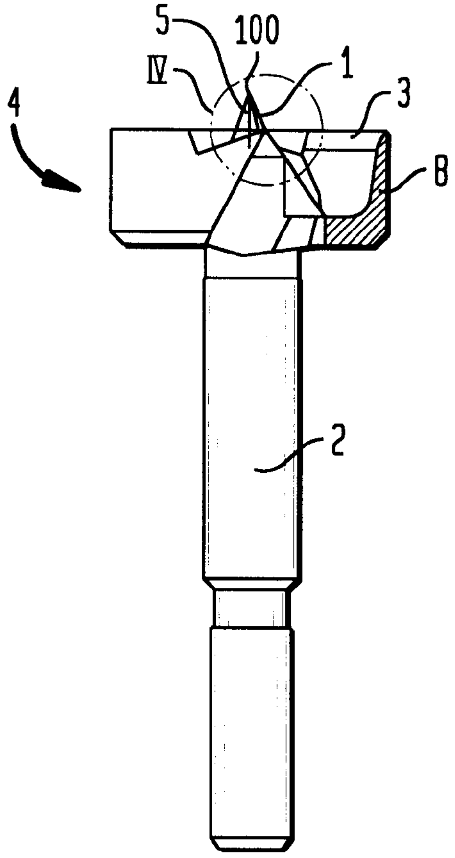
FIG. 1 is a partially sectional side view of a first embodiment of a drill bit according to the present invention.

Throughout all the Figures, same or corresponding elements are generally indicated by same reference numerals.

Turning now to the drawing, and in particular to FIG. 1, there is shown a side view of a first embodiment of a drill bit according to the present invention, configured in the form of a Forstner bit. The drill bit essentially includes a shank 2 adapted for clamping in a, not shown, chuck of a drilling machine, and a cutting head, generally designated by reference numeral 4 and connected to the shank 2. The cutting head 4 has a substantially circular hollow-cylindrical rim 8 and is provided with primary first and second cutting edges 100, 100' which are separated from one another by a projecting center point 1 and extend essentially radially outwards across the rim 8 from the center point 1 in opposite cutting direction, as shown in particular in FIG. 3.

Figure 2:
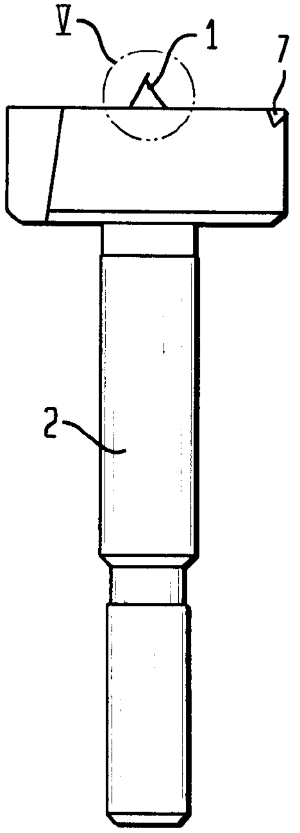
FIG. 2 is a side elevation of the drill bit of FIG. 1.
Figure 4:
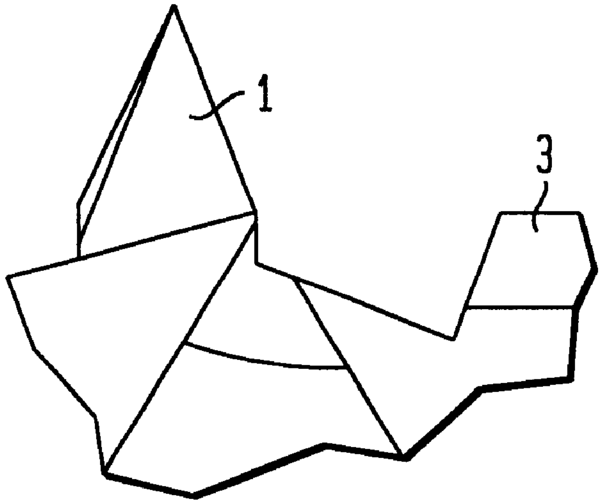
FIG. 4 is a cutaway view, on an enlarged scale, of a detail of the cutting head, marked IV in FIG. 1.
Figure 5:
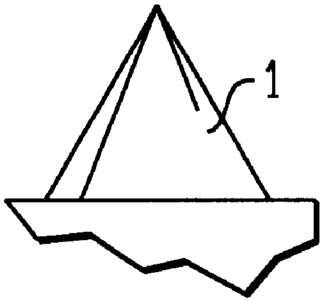
FIG. 5 is a cutaway view, on an enlarged scale, of a detail of the cutting head, marked V in FIG. 1.

As shown in FIG. 2, the center point 1 has a generally pyramidal configuration to allow a precise positioning of the drill bit on a marking for drilling a hole. The center point 1 penetrates hereby the, not shown, workpiece to be drilled to such an extent that a slippage of the drill bit is prevented, when the drilling machine is operated. FIGS. 4 and 5 show in more detail the pyramidal configuration of the center point 1. Of course, this configuration of the center point 1 is shown by way of example only, and other configurations, which generally follow the concepts outlined here, are considered to be covered by this disclosure.

The cutting head 4 is subdivided in two separate sectors which are demarcated, on the one hand, by the opposing primary cutting edges 100, 100' and, on the other hand, by rim portions 3 which extend at an acute angle with respect to the cutting edges 100, 100'. A notch 7 is provided on top of the rim 8 of each sector.

Figure 3:
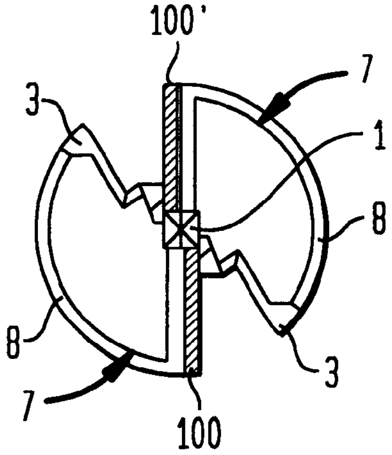
FIG. 3 is a top plan view of the drill bit of FIG. 1.
Figure 12:
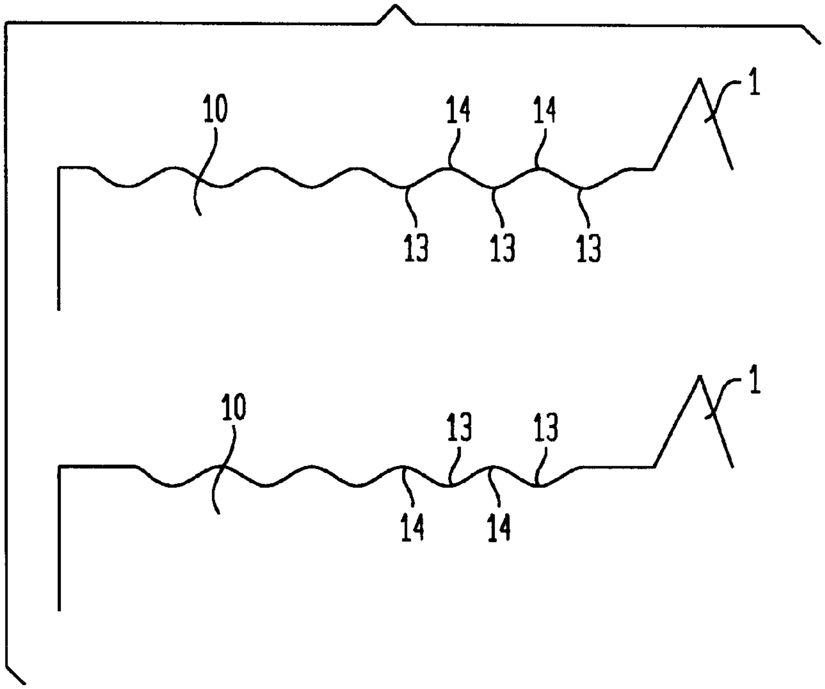
FIG. 12 is a representation of the pattern of the two cutting edges in superimposed disposition to illustrate the peaks and valleys of the cutting edges in relation to one another.

Referring now to FIG. 12, there is shown a representation of the pattern of the two cutting edges 100, 100' in superimposed disposition to better illustrate the arrangement of a series of repeating valleys 13 and peaks 14 of the cutting edges 100, 100' in relation to one another. This representation shows only a sectional view of the cutting edges in which the valleys and peaks have a flat configuration, as indicated in FIG. 3 by way of hatching.

In order to reduce the necessary drilling force, the valleys 13 and the peaks 14 alternate in radial extension of the primary cutting edges 100, 100', such that relative to the center point 1, as viewed in radial direction, at the positions of the valleys 13 of the cutting edge 100 are arranged the peaks 14 of the other cutting edge 100', and at the positions of the peaks 14 of the cutting edge 100' are arranged the valleys 13 of the other cutting edge 100. As a consequence, during rotation of the drill bit, the cutting edge 100 cuts into the workpiece being drilled along those radii where the cutting edge 100' does not cut, and vice versa.

Figure 13:
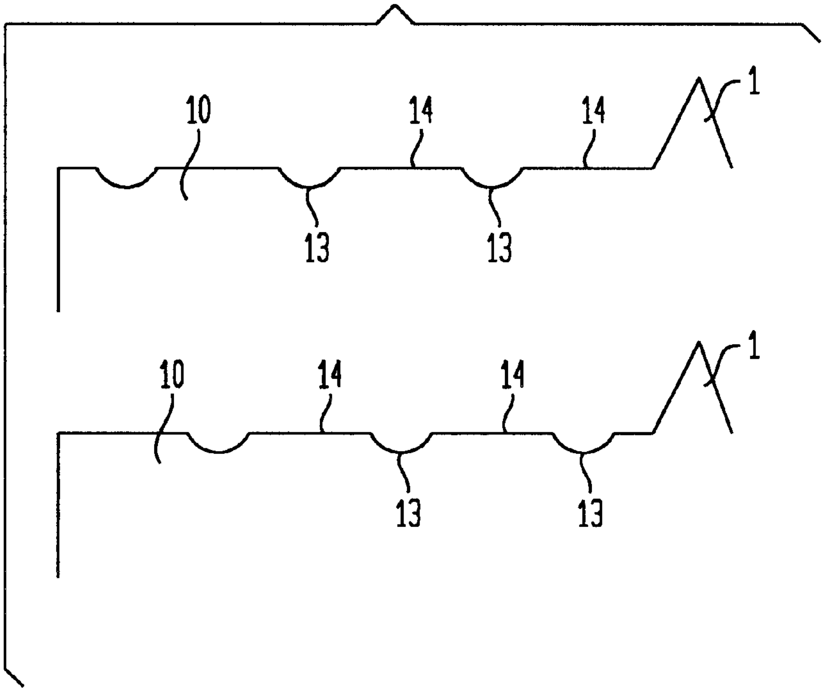
FIG. 13 is a representation of another pattern of the two cutting edges in superimposed disposition to illustrate the peaks and valleys of the cutting edges in relation to one another.

In FIG. 12, the cutting edges 100, 100' have a wave-shaped profile. An alternative is shown in FIG. 13, in which the valleys 13 and peaks 14 of the cutting edges 100, 100' are ground with a chip breaker profile. Of course, these configurations are shown by way of example only, and other configurations or patterns, which generally follow the concepts outlined here, are considered to be covered by this disclosure. As a consequence of the staggered arrangement of the valleys 13, and peaks 14 of the cutting edges 100, 100', one of the cutting edges 100, 100' cuts with its peaks 14 those areas on the workpiece over which the other one of the cutting edges 100, 100' with its valleys 13 passes by.

Figure 6:
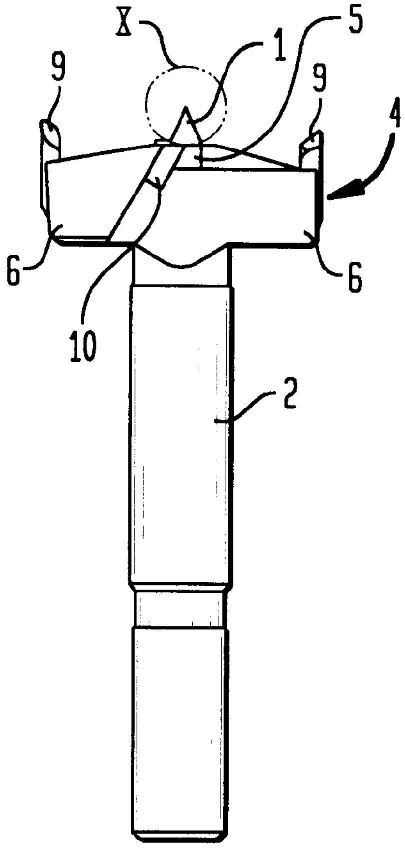
FIG. 6 is a side view of a second embodiment of a drill bit according to the present invention.
Figure 9:
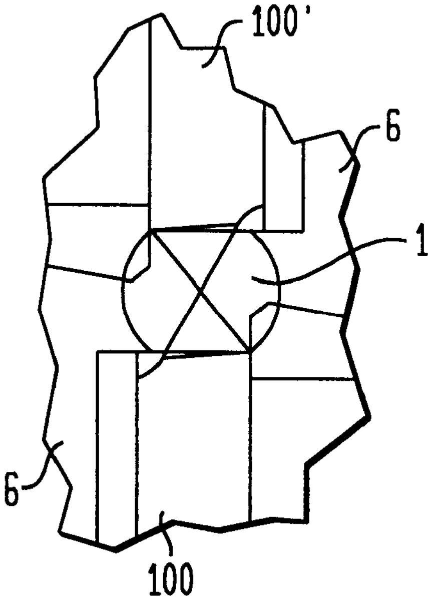
FIG. 9 is a cutaway view, on an enlarged scale, of a detail of the cutting head, marked IX in FIG. 8.
Figure 10:
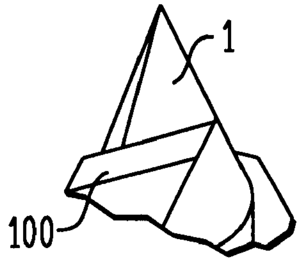
FIG. 10 is a cutaway view, on an enlarged scale, of a detail of the cutting head, marked X in FIG. 6.
Figure 11:
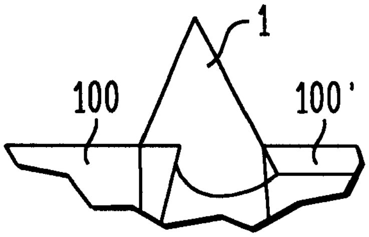
FIG. 11 is a cutaway view, on an enlarged scale, of a detail of the cutting head, marked X in FIG. 7.

Turning now to FIG. 6, there is shown a side view of a second embodiment of a drill bit according to the present invention, essentially configured in the form of a multi-spur machine bit. Parts corresponding with those in FIG. 1 are denoted by identical reference numerals and not explained again. In this embodiment, provision is made for a separate arrangement of the cutting edges 100, 100' which are welded to the cutting head 4, instead of the single-piece design of the cutting edges 100, 100' and the cutting head 4 in FIG. 1. The center point 1, which separates the cutting edges 100, 100' (FIG. 9) and is shown in more detail in FIGS. 10 and 11 in relation with the cutting edges 100, 100', extends in coincidence with the center axis of the shank 2 and projects out from the cutting head 4. As shown in particular in FIG. 8, the cutting head 4 has two solid sectors 6 which are separated from one another, with the cutting edges 100, 100' respectively attached to opposite end faces of the sectors 6 and thereby supported during rotation of the drill bit. In a manner, as described above, the cutting edges 100, 100' have a series of repeating valleys 13 and peaks 14, which so alternate in radial extension of the primary cutting edges 100, 100', that relative to the center point 1, as viewed in radial direction, at the locations of the valleys 13 of the cutting edge 100 are arranged the peaks 14 of the other cutting edge 100', and at the locations of the peaks 14 of the cutting edge 100' are arranged the valleys 13 of the other cutting edge 100.

Figure 7:
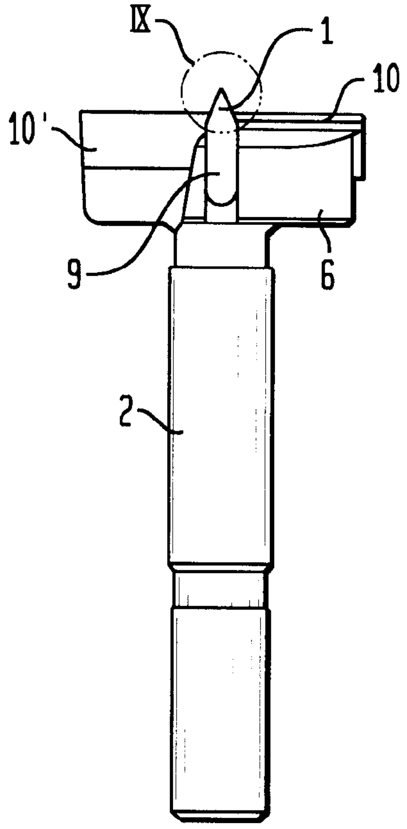
FIG. 7 is another side view of the drill bit of FIG. 6.
Figure 8:
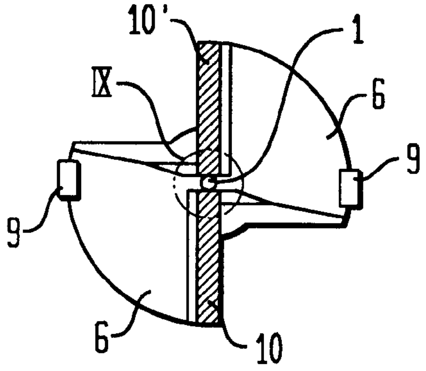
FIG. 8 is a top plan view of the drill bit of FIG. 7.

In order to improve the centered run of the drill bit, the cutting head 4 is provided with two circumferential secondary bar-shaped cutting edges 9 in 90° offset disposition to the primary cutting edges 100, 100', as shown in FIGS. 7 and 8, for providing a cutting action at the outer boundary of the respective borehole during the drilling procedure.

Figure 14:
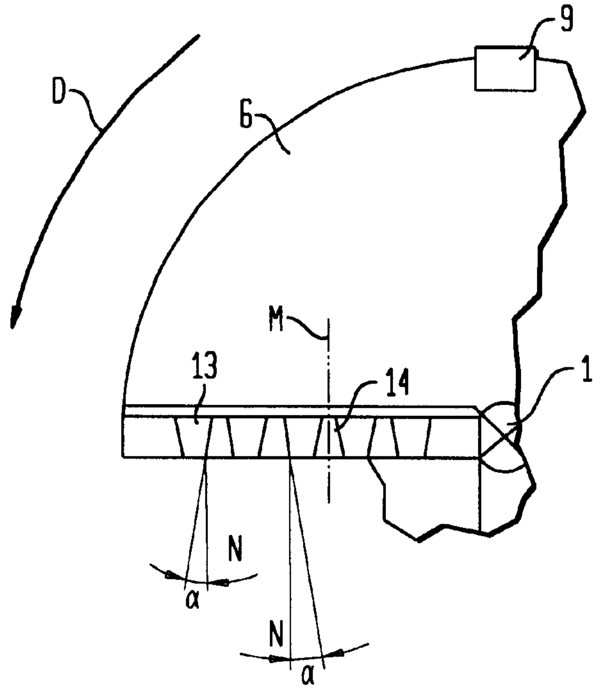
FIG. 14 is a fragmentary schematic top plan view of a third embodiment of a drill bit according to the present invention.

Turning now to FIG. 14, there is shown a fragmentary schematic top plan view of a third embodiment of a drill bit according to the present invention. Parts corresponding with those in FIG. 1 are denoted by identical reference numerals and not explained again. In this embodiment, provision is made for a tapered configuration of the cross section of the peaks 14 of each cutting edge 100, 100' (only one cutting edge is shown here), in opposition to the rotation direction D of the drill bit, as viewed in radial direction. Such a tapered peak configuration results in a distancing of the flanks of the peaks 14 from the part of the bore material which is not elevated as a consequence of the valleys during rotation of the drill bit. Thus, friction is effectively eliminated on the flanks of the drill bit, thereby reducing heat generation during the drilling procedure. A decrease of heat and required energy can be accompanied by an increase of the rotation speed and/or feed rate compared to conventional drill bits so that the time for carrying out the overall drilling procedure can be shortened. A decreased heat generation lessens also the risk of excessive heating of the drill bit.

A simple construction of the drill bit is implemented when the peaks 14 and the valleys 13 are designed in symmetry to their center line M, with the cross section of the peaks 14 having an evenly tapered configuration, whereby the flanks of the peaks 14 extend at an angle $\alpha$ with respect to the normal N upon the cutting edge. Suitably, the magnitude of the angle α is so selected that the distance between the flanks of the peaks 14 is sufficient to prevent friction and a breakage of the peaks 14 as a result of a reduced supporting zone of the peaks 14 is substantially eliminated. Practice has shown a suitable range for the angle α from 3° to 7°, in particular a range from 4° to 6°. Hereby, friction and resultant heat generation is substantially reduced while only insignificantly reducing the supporting zone of the peaks 14.

The valleys 13 of the cutting edges 100, 100' can be made in a simple manner when forming them as part of a hollow cylinder or hollow truncated cone. In this way, a miller can be used to produce the valleys 13, whereby the milling axis lies approximately in circumferential direction of the drill bit. A slanting of the milling axis allows the miller to remove more material in the part of the cutting edge 100, 100' positioned in opposition to the rotation direction D of the drill bit, so that the valley 13 is wider there. As a consequence, the cross section of the valleys 13 tapers by a constant angle α.

Through other positions of the milling axis during fabrication of the valleys 13 or use of formed cutters, other configurations can be made in a simple manner. A configuration with tapered peaks of the cutting edges 100, 100 can be provided for any grinding pattern.

Figure 14A:
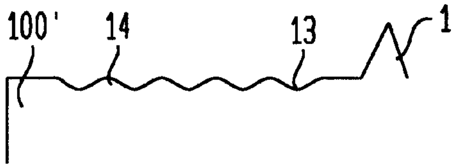
FIG. 14*a* is a representation showing a pattern of a cutting edge of the drill bit in FIG. 14.

FIG. 14*a* shows a pattern of a cutting edge of FIG. 14.

Figure 15:
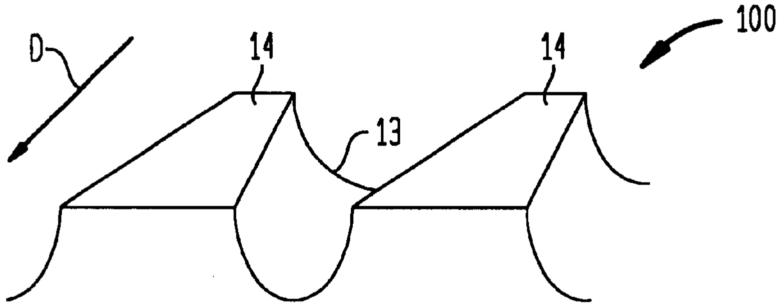
FIG. 15 is an axonometric illustration of a valley and two neighboring peaks of a cutting edge of a drill bit, showing a chip breaker formation.

FIG. 15 shows an axonometric illustration of one valley 13 and the neighboring peaks 14 of a cutting edge 100, 100' of a drill bit, showing a chip breaker formation.

While the invention has been illustrated and described as embodied in a drill bit, it is not intended to be limited to the details shown since various modifications and structural changes may be made without departing in any way from the spirit of the present invention.

What is claimed as new and desired to be protected by Letters Patent is set forth in the appended claims:

1. A drill bit, comprising:

a shank; and a cutter head connected to the shank, said cutter head having a center point and first and second cutting edges extending radially outwards from opposite sides of the center point, said first and second cutting edges so formed along their radial extension with valleys and peaks in alternating disposition that in relation to the center point, as viewed in radial direction, the valleys of the first cutting edge are arranged at locations where the peaks of the second cutting edge are disposed, and the peaks of the first cutting edge are arranged at locations where valleys of the second cutting edge are disposed.

2. The drill bit of claim 1, wherein the peaks and the valleys are formed by a grinding process selected from the group of chip breaker grinding, wave-shaped profile grinding and knurled grinding.

3. The drill bit of claim 1, wherein the center point has a circumference, and further comprising two bar-shaped cutting edges arranged in 90° offset disposition to the first and second cutting edges on the circumference of the center point.

4. The drill bit of claim 1, wherein at least one of the peaks has a tapered cross section in radial extension, as viewed in opposition to a rotation direction of the drill bit, and wherein at least one of the valleys has a widening cross section in radial extension, as viewed in opposition to the rotation direction of the drill bit.

5. The drill bit of claim 4, wherein the at least one of the peaks defines a center line and is configured in symmetry to the center line.

6. The drill bit of claim 4, wherein the cross section of the at least one of the peaks evenly tapers in opposition to a rotation direction of the drill bit and defines flanks, with each of the flanks extending at a constant angle with respect to a normal to the cutting edges, said valleys being configured as a part of one of a hollow cylinder and hollow truncated cone.

7. The drill bit of claim 6, wherein the constant angle ranges from 3° to 7°.

8. The drill bit of claim 7, wherein the constant angle ranges from 4° to 6°.

9. A drill bit, comprising a cutter head having a center point and two primary cutting edges which extend radially outwards from opposite sides of the center point, each of the cutting edges formed with a pattern of alternating valleys and peaks such that the peaks of one of the cutting edges are formed at locations where the valleys of the other one of the cutting edges are disposed when acting on a workpiece during rotation of the cutter head, thereby splitting a cutting force to be applied on the workpiece into two portions, with one of the cutting edges applying one portion of the cutting force, and with the other one of the cutting edges applying the other portion of the cutting force.

10. The drill bit of claim 9, wherein the peaks and the valleys are formed by a grinding process selected from the group of chip breaker grinding, wave-shaped profile grinding and knurled grinding.

11. The drill bit of claim 9, wherein the center point has a circumference, and further comprising two bar-shaped secondary cutting edges arranged in 90° offset disposition to the primary cutting edges on the circumference of the center point.

12. The drill bit of claim 9, wherein at least one of the peaks has a tapered cross section in radial extension, as viewed in opposition to a rotation direction of the cutter head, and wherein at least one of the valleys has a widening cross section in radial extension, as viewed in opposition to the rotation direction of the cutter head.

13. The drill bit of claim 12, wherein the at least one of the peaks defines a center line and is configured in symmetry to the center line.

14. The drill bit of claim 12, wherein the cross section of the at least one of the peaks evenly tapers in opposition to a rotation direction of the cutter head and defines flanks, with each of the flanks extending at a constant angle with respect to a normal to the cutting edges, said valleys being configured as a part of one of a hollow cylinder and hollow truncated cone.

15. The drill bit of claim 14, wherein the constant angle ranges from 3° to 7°.

16. The drill bit of claim 14, wherein the constant angle ranges from 4° to 6°.

* * * * *